May 29, 1934. F. W. ADAMS 1,960,428
CONTINUOUS WEIGHING DEVICE
Filed Sept. 13, 1928  2 Sheets-Sheet 2
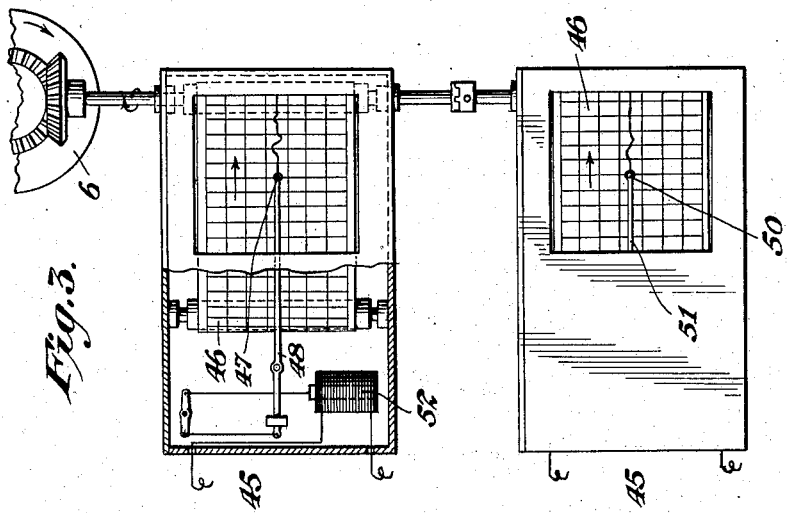
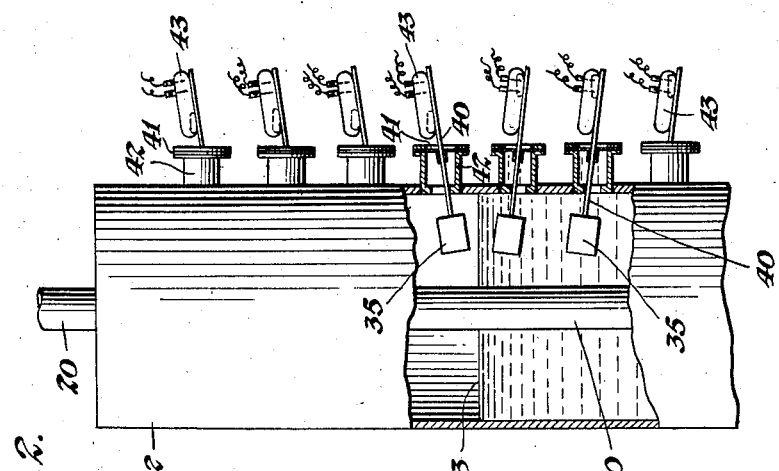
FLOYD W. ADAMS
INVENTOR
BY *Forbes Silsby*
ATTORNEY

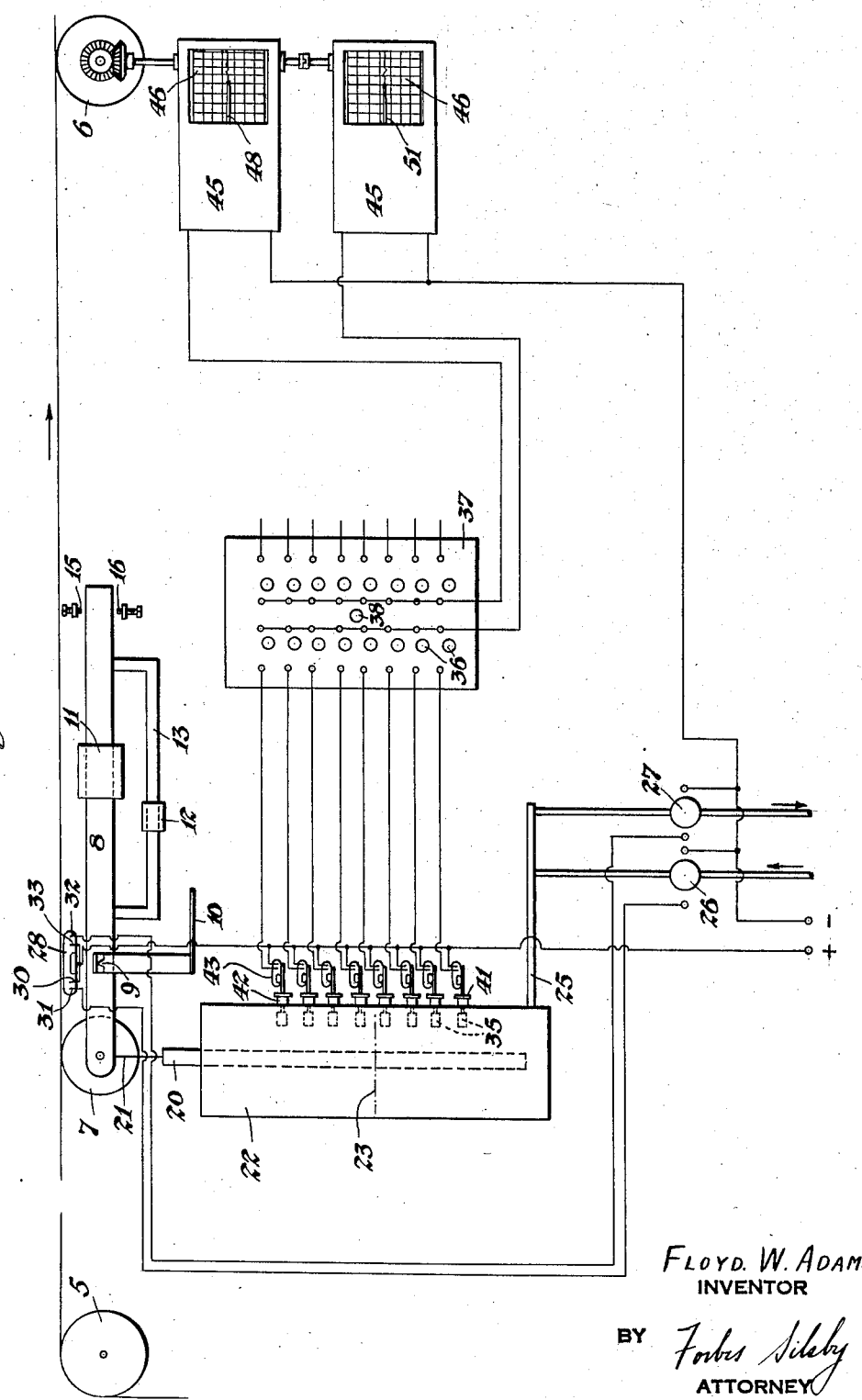

UNITED STATES PATENT OFFICE 1,960,428

CONTINUOUS WEIGHING DEVICE

Floyd W. Adams, Peoria, Ill., assignor to The Barrett Company, New York, N. Y., a corporation of New Jersey Application September 13, 1928, Serial No. 305,624

3 Claims. (Cl. 265—43)

The present invention relates to weighing apparatus particularly adapted for use in connection with paper making machines. The invention has been developed to provide an improved apparatus for detecting variations in the weight of the felt web produced by a paper making machine and for convenience of disclosure such an apparatus will be described to illustrate the principles involved, but it will be understood that the particular description is illustrative merely and is not intended as defining the limits of the invention. The apparatus to be particularly described detects variations in the weight of the web at either side thereof and comprises means for indicating to the operator and making a permanent record of the variations detected.

The nature and objects of the inventions will be better understood from a description of the particular illustrative apparatus for the purpose of which description reference should be had to the accompanying drawings, forming a part hereof and in which—

Figure 1 is a diagrammatic view of a weighing device arranged to be applied to a paper making machine to indicate to the operator the variations in weight of the product of the machine and to make a permanent record of such variations, Figure 2 is an enlarged fragmentary view, partly in section, of the liquid container, and Figure 3 is an enlarged detail view of the recording mechanism, broken away to show concealed parts.

In the apparatus shown the web after it leaves the dry end of the paper machine passes over the spaced stationary rolls 5, 6 which are positioned upon the same level. Intermediate the stationary rolls is a vertically movable floating roll 7 which also supports the paper web and forms a part of the weighing apparatus. Each end of the floating roll is carried by a weighing lever or beam 8 supported on the knife edge 9 secured to a suitable fixed support 10. Since the weighing means at both sides is similar a description of one will serve for both. On the weighing beam 8 are two sliding weights 11, 12, the former of which is used primarily to balance the weight of the floating roll 7 about the knife edge 9 and the latter of which is adjustable along the scale 13 (which may be graduated if desired) to a position corresponding to the gauge weight of the paper being run. The pivotal movement of the weighing beam 8 is limited by stops 15, 16 at the free end thereof to prevent excessive movement.

Variations in the weight of the paper will cause movement of the floating roll 7 and of the weighing beam 8 about the pivotal support 9. In the apparatus shown means is provided for so balancing the weight of the paper as supplied to the supporting roll 7 that said roll and the weighing beam will be maintained normally in zero position even though the weight of the paper varies from standard weight. This is accomplished by providing means for increasing or diminishing the balancing force whenever the roll moves upwardly or downwardly from its zero position in response to variations in the weight of the paper thereon.

In the arrangement illustrated a balancing element 20 is suspended from the weighing beam 8 as by means of a chain 21 and is movable in a suitable liquid container 22, means being provided for admitting liquid to this container and withdrawing liquid therefrom to thereby decrease or increase the effective weight of said balancing member 20. Normally when the weight of the paper is true to gauge the liquid level in the container will be maintained at the intermediate or zero level indicated at 23, but when the paper is running light the liquid level will be lower and when it is heavy the liquid level will be higher.

The balancing member 20, if desired, may be in the form of a sealed hollow tube. Water may be supplied to or withdrawn from the bottom of the container 22 through the pipe 25, the inflow from the water supply being controlled by an electrically operated valve 26, such as a solenoid valve, and the outlet to the drain being controlled by a similar electrically operated valve 27. The valves 26, 27 are automatically operated upon movement of the weighing arm 8 from its zero position. As shown a mercury cylinder 28 carried by the said arm is arranged to close two circuits alternatively to open said valves. When an increased weight on the floating roll 7 causes the same to move downwardly, the mercury in the tube 28 will move to the left engaging the two electric terminals 30, 31 to close the electric circuit to actuate the valve 26 to admit water to the container 22 thereby to balance the weighing arm at its zero position. When the roll is returned to its normal or zero position the circuit will again be broken and the valve 26 closed.

When a lighter section of the paper web permits a raising of the roll 7 the mercury in the tube will engage the other set of contacts 32, 33 to complete the circuit and operate the valve 27 to permit an exhaust of water from the cylinder 22 until the level of the weighing beam is again restored.

When the weighing arm is in its zero position the mercury will rest in the middle of the cylinder and neither circuit will be closed.

The diameter of the balancing member or sealed tube 20 will be proportioned in accordance with the desired sensitiveness of the apparatus. For example, it may be so designed that a difference of one inch in the level of the water in the container 22 will correspond to a difference of ¼ of a point gauge in the weight of the paper being weighed or examined.

The level of the water in the container 22 and therefore the weight of the paper on the roll 7 is preferably visually indicated and in the arrangement shown the means for providing visual indication is such that the indicator may be positioned at any desired or convenient point and at a considerable distance from the weighing apparatus if desired. In the arrangement shown a plurality of floats 35 are arranged at different elevations in the container 22 each being connected to cause the lighting of a corresponding signal light 36 on a suitable conveniently placed signal board 37.

As shown a central standard light 38 is positioned on the board at a point corresponding in elevation to the normal or zero height of liquid in the container 22. The several signal lights may be arranged in the form of an H, as indicated, with a central light 38 indicating the normal or zero elevation. The lights on the left leg of the H may be connected to one weighing apparatus to show the weight of the paper of one side of the web, and the lights on the other leg may be connected to the other weighing apparatus to show the weight of the other side of the web, the central light 38 showing the zero level for both.

The connections between the floats and the lights may be of any desired form. As shown, each float 35 is secured to a suitable stem 40 and projects through and tightly fits a rubber cap 41 fitting a nipple 42 screwed into the side of the container 22. On the outer end of the stem 40 is carried a mercury cylinder 43 so arranged that when the float 35 rises the mercury in the cylinder will engage a pair of electric contacts to close a circuit through the corresponding signal light.

When the level of the water is below a float 35 the weight of the float will tilt the mercury cylinder to position to open the circuit but as the water rises to engage the float the circuit will be closed.

A suitable recording mechanism is connected with the indicating signal system to make a permanent record of the variations in the weight of the paper web. As shown, diagrammatically, for the purposes of illustration, the recorder 45 comprises a mechanism whereby a record strip 46, or as illustrated in the drawings two separate record strips, will be actuated by one of the stationary rolls 6 and suitable pens arranged to record the variations in the weight of the paper on said strips. Instead of actuating the recorder by the roll 6, a clock mechanism (not shown) may be provided for driving the recorder at a constant speed. As shown, the pen 47 carried by the arm 48 is actuated by a solenoid 52 connected in series with the several signal lights of one series and the pen 50 carried by the arm 51 is actuated by a solenoid connected in series with the second series of lights. The current through the solenoid and therefore the position of the pen will vary according to the number of lights the circuits of which are closed. The record strips, therefore, will show the variations of the weight of both sides of the paper web.

The foregoing description is illustrative merely. Variations in the particular embodiment and other embodiments may be developed without departing from the spirit of the invention.

I claim:

1. In apparatus for detecting variations in the weight of a moving continuous member, the combination with a movable support over which said continuous member is arranged to pass, of weighing mechanism for balancing the weight of the continuous member on the support comprising an element connected to said support, a container, a balancing member connected to said element and extending into said container, means controlled automatically by movement of the support to admit liquid to said container or withdraw liquid from said container to counterbalance variations in weight of said continuous member, means for indicating the level of liquid in said container, and means for recording continuously the level of the liquid in said container.

2. In apparatus for detecting variations in the weight of a moving continuous member, the combination with a movable support over which said continuous member is arranged to pass, of weighing mechanism for balancing the weight of the continuous member on the support comprising a scale beam, a container, a balancing member connected to said scale beam and extending into said container, means controlled by movement of the scale beam for admitting liquid to or withdrawing liquid from said container to balance the variations in weight of the continuous member on said movable support and means controlled by variation in level of liquid in said container for recording the variations in weight of said continuous member.

3. In apparatus for detecting variations in the weight of a moving continuous member, the combination with a movable support over which said continuous member is arranged to pass, of weighing mechanism for balancing the weight of the continuous member on the support comprising, a weighing beam connected to said movable support, an adjustable slide thereon, alternative electrical circuits, means carried by the weighing beam for selectively closing said alternative electrical circuits as said beam moves to either side of its zero position, a container, a balancing member connected to said weighing beam and extending into said container, valved means controlled by said electrical circuits and operated upon the closing of said circuits for alternatively admitting fluid to said container or withdrawing fluid therefrom, a plurality of indicator signals, electric circuits therefor and means arranged to close said electric signal circuits selectively in response to variations in level of the liquid in said container.

FLOYD W. ADAMS.